(12) United States Patent
Tian et al.

(10) Patent No.: US 10,981,204 B2
(45) Date of Patent: Apr. 20, 2021

(54) METHOD AND SYSTEM FOR THERMAL DESORPTION TREATMENT OF ORGANIC-CONTAMINATED SOIL AND TREATMENT OF DESORBED WASTE GAS

(71) Applicant: KUNMING UNIVERSITY OF SCIENCE AND TECHNOLOGY, Kunming (CN)

(72) Inventors: Senlin Tian, Kunming (CN); Jianhong Huang, Kunming (CN); Xiangliang Liu, Kunming (CN); Yingjie Li, Kunming (CN); Xuewei Hu, Kunming (CN); Ping Ning, Kunming (CN)

(73) Assignee: Kunming University Of Science And Technology, Yunnan (CN)

(*) Notice: Subject to any disclaimer, the term of this patent is extended or adjusted under 35 U.S.C. 154(b) by 0 days.

(21) Appl. No.: 16/419,767

(22) Filed: May 22, 2019

(65) Prior Publication Data

US 2019/0358689 A1 Nov. 28, 2019

(30) Foreign Application Priority Data

May 23, 2018 (CN) .......................... 201810498207.4

(51) Int. Cl.
B09C 1/00 (2006.01)
B09C 1/08 (2006.01)
(Continued)

(52) U.S. Cl.
CPC ............ B09C 1/08 (2013.01); B01D 53/1487 (2013.01); B01D 53/1493 (2013.01);
(Continued)

(58) Field of Classification Search
CPC .. B01D 53/1493; B01D 53/1487; B09C 1/06; B09C 1/08
See application file for complete search history.

(56) References Cited

U.S. PATENT DOCUMENTS 4,738,206 A * 1/1988 Noland
5,375,539 A * 12/1994 Rippberger

FOREIGN PATENT DOCUMENTS

| CN | 101530858 A | 9/2009 |
| CN | 101947543 B | 10/2011 |

(Continued)

*Primary Examiner* — Janine M Kreck
(74) *Attorney, Agent, or Firm* — Avant Law Group, LLC

(57) ABSTRACT

The present invention discloses a method and system for thermal desorption treatment of organic-contaminated soil and treatment of desorbed waste gas. The system includes a thermal incinerator, a desorption flue gas temperature regulating device, a thermal desorption reactor, a dust collector, a heat exchange/steam separator, an absorption reactor, a star-shaped unloader, and a soil cooler. An absorbent containing organic pollutants is used as a fuel, and subjected to thermal incineration to achieve the decomposition and harmless treatment of the organic pollutants; and high temperature flue gas generated by the incineration is used as a heat carrier for thermal desorption remediation of the organic-contaminated soil; and by means of the high solubility capability of fuel oil to organic matter, the fuel oil is used as an absorbent to absorb and purify the organic pollutants in desorbed waste gas, so that the gas is purified gas and up-to-standard discharge is achieved. The present invention achieves the thermal desorption of the organic pollutants, the absorption and purification of the pollutants in the desorbed waste gas, and the thorough decomposition of the organic pollutants; the fuel oil has both functions of the absorbent and the fuel, and the present invention has the advantages of short process, low energy consumption, simple equipment and low cost.

3 Claims, 1 Drawing Sheet

(51) Int. Cl.
   *B01D 53/14*  (2006.01)
   *B01D 53/18*  (2006.01)
   *B09C 1/06*   (2006.01)

(52) U.S. Cl.
   CPC ................ *B01D 53/18* (2013.01); *B09C 1/06* (2013.01); *B01D 2252/205* (2013.01)

(56) References Cited

FOREIGN PATENT DOCUMENTS

| | | |
|---|---|---|
| CN | 101972773 B | 4/2012 |
| CN | 102069088 B | 7/2012 |
| CN | 102513346 B | 9/2013 |
| CN | 102580994 B | 12/2013 |
| CN | 103658165 A | 3/2014 |
| CN | 103962374 A | 8/2014 |
| CN | 103008337 B | 11/2014 |
| CN | 104307864 A | 1/2015 |
| CN | 104307865 A | 1/2015 |
| CN | 104607455 A | 5/2015 |
| CN | 104646409 A | 5/2015 |
| CN | 104759464 A | 7/2015 |
| CN | 104971819 A | 10/2015 |
| CN | 105964671 A | 9/2016 |
| CN | 104607455 B | 11/2016 |
| CN | 106140801 A | 11/2016 |
| CN | 106216382 A | 12/2016 |
| CN | 106799392 A | 6/2017 |

\* cited by examiner

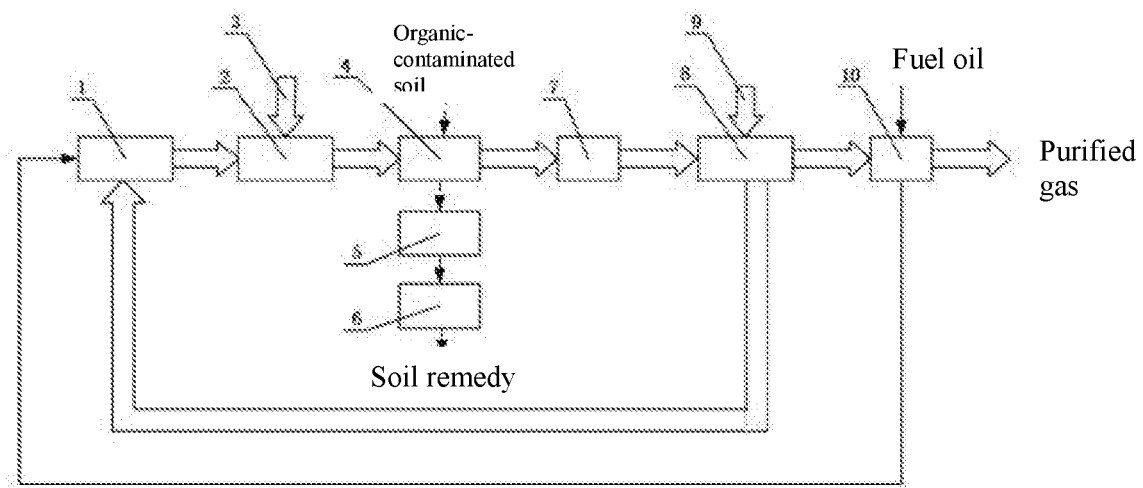

METHOD AND SYSTEM FOR THERMAL DESORPTION TREATMENT OF ORGANIC-CONTAMINATED SOIL AND TREATMENT OF DESORBED WASTE GAS

This application claims priority to Chinese application number 201810498207.4, filed May 23, 2018, with a title of METHOD AND SYSTEM FOR THERMAL DESORPTION TREATMENT OF ORGANIC-CONTAMINATED SOIL AND TREATMENT OF DESORBED WASTE GAS. The above-mentioned patent application is incorporated herein by reference in its entirety.

TECHNICAL FIELD

The present invention belongs to the field of regeneration of contaminated soil, and particularly relates to a method and system for thermal desorption treatment of organic-contaminated soil and treatment of desorbed waste gas.

BACKGROUND

The problem of soil contamination in China is very prominent, and there is an urgent need for a remedy technology. Contaminated soil can be divided into organic-contaminated soil and inorganic-contaminated soil. According to the nature of organic pollutants, technologies for remediation of organic-contaminated soil mainly include thermal desorption, steam extraction, chemical oxidation/reduction, a fixation/stabilization method, an incineration method, a microbial method, a phytoremediation method, and the like. The thermal desorption technology is one of the effective methods for remediation of organic-contaminated soil. Different heat sources are used to heat the organic-contaminated soil to be close to or above the boiling point of organic matter by heating, so that organic pollutants are volatilized and separated from the soil, and then the desorbed waste gas is treated to achieve the goal of remediation. The thermal desorption method can effectively remove volatile and semi-volatile organic pollutants in soil, such as volatile organic compounds (VOCs), polycyclic aromatic hydrocarbons (PAHs), and polychlorinated biphenyls (PCBs). This technology began in the 1980s, and the proportion of remediation of organic-decontaminated soil by the organic desorption technology in the United States reaches more than 70%; however, in China, the thermal desorption technology is just in the beginning stage. Existing technologies for remediation of organic-contaminated soil by thermal desorption mainly differ in heat sources and fuels used, energy recovery and energy saving methods, methods for treatment and disposal of desorbed waste gas, and the like.

The heat sources and fuels are the main aspects that determine the cost and feasibility of remediation. Low-cost and easily-accessible heat sources and fuels are favorable for the implementation and promotion of the technology. The heat sources and fuels used in the prior art include: (1) combustion tail gas generated by desorbed organic pollutants as a fuel (CN 106216382 A), (2) electric energy, natural gas or hot flue gas (CN 104971819 A, CN106140801 A, CN105964671 A, CN106 799392 A, CN101972773 B, CN102069088 B), (3) waste heat of high temperature flue gas, high temperature air, high temperature steam or high temperature liquid (CN 104307865 A), (4) natural gas, biomass fuel, and the like (CN104646409 A), (5) coal, liquefied gas or natural gas (CN 101530858A, CN104 759464 A), (6) high temperature flue gas generated by mixed combustion of gas and desorbed waste gas (CN103962374 A), and (7) clean tail gas of a power plant (CN101947543 B). The prior art generally uses gaseous fuels such as natural gas, solid fuels such as coal and liquid fuels such as biomass fuel as fuels for combustion, to generate a high temperature gas for desorption, or directly uses electrolytic heat to achieve thermal desorption, where the gaseous fuels have the problems of being high in cost, limited in source and unfavorable for on-site remediation and use in practical application; the liquid fuels are convenient to transport, but if the liquid fuels are only used to generate high temperature gas, there is a problem of high cost; the costs of the solid fuels are low, but there are problems that a combustion device is complicated and the generated high temperature gas has a high impurity content, making the subsequent purification difficult. For example, the Chinese invention patent with the publication number CN106140801 A discloses a method for remediation of organic-contaminated soil, in which heavily-contaminated soil is preheated with hot tail gas of a thermal desorption device, hot flue gas of a natural gas combustion device is a heat source, the heavily-contaminated soil is subjected to thermal desorption treatment by indirect heating, and the soil is mixed with lightly-contaminated soil and then subjected to low-temperature thermal desorption, and waste gas containing organic pollutants and generated by desorption is mixed with natural gas for combustion, thereby achieving the goal of decomposition. The problem of the technology is that the introduction of the waste gas into a combustion system will affect combustion process conditions of the natural gas, which is not conducive to the control of the combustion process. The Chinese invention patent with the publication number CN 106216382 A discloses a system and method for thermal desorption treatment of organic-decontaminated soil, according to which heat-carrying gas is generated by using the combustion of desorbed organic pollutants, the heat-carrying gas exchanges heat with the desorbed waste gas, and part of all of the heat-carrying gas enters an adsorption system to perform desorption on the contaminated soil by indirect heating. The system utilizes the waste gas generated by desorption as an energy source, and no fuel is added except for the start-up phase of the system. For the soil subjected to contamination by high-concentration organic matter, the system has effects of high efficiency and energy saving. However, if the concentration of organic pollutants in the soil is lower, desorbed waste gas is not sufficient for spontaneous combustion, and when sufficient heat is provided for desorption, the system application is limited. At present, there is no disclosure of a technical solution of using a liquid fuel as an absorbent for purifying desorbed waste gas, and using a mixture of the liquid fuel and desorbed organic pollutants as a fuel.

In the prior art, methods for treatment and disposal of desorbed waste gas containing organic pollutants include direct combustion without refueling as a desorption heat source, dedusting purification, and mixing with gas fuels such as natural gas for combustion decomposition (CN106140801 A, CN103962374 A), activated carbon adsorption and purification (CN 103658165 A), dedusting, combustion or direct use for soil preheating (CN 104307864 A, CN 104607455 A), high temperature incineration treatment after dedusting (CN103008337 B, CN105964671 A), condensation method separation and recovery of organic matter in waste gas (CN106799392 A), chemical oxidation/reduction purification treatment (CN102580994B), adsorption and purification treatment after preheating of desorbed air (CN101972773 B, CN102069088 B, CN104607 455B), lye absorption method purification (CN 101530858A), and incineration purification in a cement kiln (CN 102513346 B). In the prior art, a mode of utilizing waste heat of desorbed waste gas is mainly used for preheating or pre-desorption of contaminated soil and preheating of desorbed air, and there is no disclosure of a utilization mode of heat exchange through adsorbed waste gas and the combustion of combustion-supporting air. In the existing technical solution, the adsorbed waste gas is purified by dry methods such as activated carbon adsorption, and the purification efficiency is high, but it is difficult to ensure the treatment effect on adsorbed waste gas with high-concentration and high-humidity organic pollutants, and the cost is low; a condensation recovery method is only suitable for treatment of high-concentration waste gas, and it is difficult for purified gas to reach the emission standard; some technologies adopt a method for decomposition treatment of waste gas by using a combustion system. For example, the Chinese invention patent No. CN103962374 A discloses a system for thermal desorption remediation treatment of organic-contaminated soil, gas and desorbed waste gas are subjected to mixed combustion in a combustion and tail gas treatment system composed of a combustion chamber and a burner to generate high temperature flue gas, and the thermal desorption treatment of the organic-contaminated soil is realized in a double-tube rotary kiln by indirect heating. However, there is no disclosed technology for absorbing and purifying adsorbed waste gas by using an organic solvent such as fuel oil, and there is also no technology of performing mixed combustion of separated organic pollutants and fuels to decompose the pollutants and generate a high temperature gas for thermal desorption of soil.

SUMMARY

Against the problems of high costs of thermal desorption heat sources/fuels, complicated desorption waste gas treatment methods, complexity in disposal of an adsorbent for purifying adsorbed waste gas, long procedures of thermal desorption, waste heat utilization and purification of the adsorbed waste gas, difficulty in combination of functional units, and the like in an existing technology for remediation of organic-contaminated soil, the present invention provides a method and system integrating thermal desorption treatment of organic-contaminated soil and treatment of desorbed waste gas. By means of the high solubility capability of fuel oil to organic matter, the fuel oil is used as an absorbent to absorb and purify organic pollutants in desorbed waste gas, and the purified gas is subjected to up-to-standard discharge; the fuel oil containing the organic pollutants is used as a fuel, and the decomposition and harmless treatment of organic pollutants are achieved by the thermal incineration in the high-temperature combustion process; and high temperature flue gas generated by the incineration is used as a heat carrier for thermal desorption remediation of organic-contaminated soil.

The present invention provides a method for thermal desorption treatment of organic-contaminated soil and treatment of desorbed waste gas, which includes the following specific steps:

step 1 of thermal incineration: mixing fuel oil and combustion-supporting gas and performing thermal incineration to generate high temperature flue gas of 800-1500° C.;

step 2 of flue gas temperature regulation: mixing the high temperature flue gas generated in step 1 with normal temperature gas to obtain thermally-desorbed flue gas, and adjusting, by changing the flow ratio of the high temperature flue gas to the normal temperature gas, the temperature of the thermally-desorbed flue gas to the temperature 120-820° C. which is required for the thermal desorption of organic-contaminated soil;

step 3 of thermal desorption: subjecting the thermally-desorbed flue gas obtained after the temperature regulation in step 2 to reverse contact with the to-be-treated organic-contaminated soil for 5-25 min, and desorbing organic pollutants under high temperature and entering into desorbed flue gas, to form the desorbed waste gas containing the organic pollutants and thermally-desorbed soil;

step 4 of dedusting: dedusting the desorbed waste gas containing the organic pollutants obtained in step 3, and separating particulate matter from the waste gas to generate dedusted waste gas containing the organic pollutants;

step 5 of heat exchange: performing indirect heat exchange between the dedusted adsorbed waste gas containing the organic pollutants in step 4 and the combustion-supporting gas to lower the temperature of the adsorbed waste gas containing the organic pollutants and increase the temperature of the combustion-supporting gas, separating moisture contained in the adsorbed waste gas containing the organic pollutants in the form of condensed water, and feeding the heated combustion-supporting gas to step 1;

step 6 of absorption and purification: subjecting the adsorbed waste gas containing the organic pollutants treated in step 5 to countercurrent contact with fresh fuel oil to make the organic pollutants in the waste gas absorbed and purified by the fuel oil, and performing up-to-standard discharge of the waste gas; and feeding the fuel oil containing the organic pollutants back to step 1 for thermal incineration; and step 7 of soil cooling: cooling the thermally-desorbed soil in step 3, and then humidifying the soil with the condensed water obtained in step 5 and discharging the soil.

The fuel oil in step 1 is one or a liquid mixture of two or more selected from a group consisting of light diesel oil, heavy diesel oil, kerosene, heavy oil, biodiesel, petroleum washing oil, tar washing oil, ethanol, methanol, heptane, n-hexane, and n-octane at any proportion; the combustion-supporting gas is a gas providing oxygen for combustion of the fuel oil and includes a gas with an air or oxygen volume fraction of 25%-100%; and the normal temperature gas in step 2 is one or a mixture of two selected from a group consisting of room temperature air and room temperature nitrogen in any proportion.

The organic-contaminated soil in step 3 is an organic-contaminated soil having an organic pollutant boiling point of 100-800° C., and the organic pollutants include polycyclic aromatic hydrocarbons, polychlorinated biphenyls, benzene series, pesticides, ethers, halogenated aliphatic hydrocarbons or halogenated aromatic hydrocarbons, and specific organic pollutants include one or more selected from a group consisting of benzene, toluene, ethylbenzene, xylene, naphthalene, benzanthracene, benzofluoranthene, benzopyrene, periflanthene, dibenzanthracene, dichlorodiphenyl Trichloroethane, and benzene hexachloride.

A system for thermal desorption treatment of organic-contaminated soil and treatment of desorbed waste gas includes a thermal incinerator, a desorption flue gas temperature regulating device, a thermal desorption reactor, a dust collector, a heat exchange/steam separator, an absorption reactor, a star-shaped unloader, and a soil cooler, where the thermal incinerator, the desorption flue gas temperature regulating device, the thermal desorption reactor, the dust collector, the heat exchange/steam separator and the absorption reactor are sequentially connected with each other, and a valve is disposed between any two of the above components connected with each other; the desorption flue gas temperature regulating device is further connected with a normal temperature gas pipeline, and a valve is disposed between the two; the thermal desorption reactor is further connected with the star-shaped unloader, and a valve is disposed between the two; the star-shaped unloader is connected with the soil cooler; the heat exchange/steam separator is further respectively connected with a combustion-supporting gas pipeline and the thermal incinerator, and a valve is disposed between any two of the three connected with each other; the absorption reactor is further connected with the thermal incinerator, and a valve is disposed between the two; and the absorption reactor is further provided with a fuel oil inlet.

The thermal incinerator is a mechanical atomized fuel burner, a revolving cup type atomized fuel burner, an air atomized fuel burner, or a steam atomizing burner.

The thermal desorption reactor is a rotary kiln, a fixed bed reactor, a fluidized bed reactor, or a moving bed reactor.

The dust collector is a bag-type dust collector, an electrostatic dust collector, a cyclone dust collector, an electric-bag composite dust collector, a spray tower, a scrubber, or an impact dust collector.

The heat exchange/steam separator is a double-pipe heat exchanger, a plate heat exchanger, a fixed tube-sheet heat exchanger, a floating head type heat exchanger, or a U-tube heat exchanger.

The absorption reactor is a packed tower, a turbulent ball tower or a sieve-plate tower; the packed tower is used as an absorption reactor, and the gas velocity of the empty tower is controlled at 0.1-2.0 m/s; the turbulent ball tower is an absorption reactor, and the gas velocity control of the empty tower is controlled at 1.0-7.0 m/s; the sieve-plate tower is used as an absorption reactor, and the gas velocity of the empty tower is controlled at 0.8-3.0 m/s.

The soil cooler is a water-cooled screw conveyor.

The desorption flue gas temperature regulating device is a container in which a high temperature gas and a normal temperature gas are placed and mixed and subjected to temperature adjustment.

The beneficial effects of the present invention include:

1. The present invention can simultaneously achieve the thermal desorption of organic pollutants, the absorption and purification of pollutants in desorbed waste gas, and the efficient and complete decomposition of the organic pollutants; fuel oil has both functions of absorbent and fuel, with neither the need for a complex system for treatment of desorbed waste gas by conventional thermal desorption nor the need for a device for treatment of a saturated absorbent necessary for the conventional absorption and purification of desorbed waste gas, and the present invention has the advantages of short process, low energy consumption, simple equipment, low cost and the like.

2. The fuel oil of the present invention is not directly used as a heat source. By means of the high solubility capability of fuel oil to organic matter, the fuel oil is first used as an absorbent to absorb and purify organic pollutants in desorbed waste gas, and the purified gas is subjected to up-to-standard discharge; the absorbent containing the organic pollutants is used as a fuel, and the decomposition and harmless treatment of organic pollutants are achieved by the thermal incineration in the high-temperature combustion process; and high temperature gas generated by the incineration is used as a heat carrier for thermal desorption remediation of organic-contaminated soil, providing heat for thermal desorption.

BRIEF DESCRIPTION OF THE DRAWINGS

FIG. 1 is a schematic structural view of a system for thermal desorption treatment of organic-contaminated soil and treatment of desorbed waste gas according to Embodiment 1 of the present invention. In the FIGURE, 1. thermal incinerator, 2. desorption flue gas temperature regulating device, 3. normal temperature gas pipeline, 4. thermal desorption reactor, 5. star-shaped unloader, 6. soil cooler, 7. dust collector, 8. heat exchange/steam separator, 9. combustion-supporting gas pipeline, 10. absorption reactor.

DETAILED DESCRIPTION OF EMBODIMENTS

Embodiment 1

A system for thermal desorption treatment of organic-contaminated soil and treatment of desorbed waste gas, as shown in FIG. 1, includes a thermal incinerator 1, a desorption flue gas temperature regulating device 2, a thermal desorption reactor 4, a star-shaped unloader 5, a soil cooler 6, a dust collector 7, a heat exchange/steam separator 8, an absorption reactor 10, where the thermal incinerator 1, the desorption flue gas temperature regulating device 2, the thermal desorption reactor 4, the dust collector 7, the heat exchange/steam separator 8 and the absorption reactor 10 are sequentially connected with each other, and a valve is disposed between any two of the above components connected with each other; the desorption flue gas temperature regulating device 2 is further connected with a normal temperature gas pipeline 3, and a valve is disposed between the two; the thermal desorption reactor 4 is further connected with the star-shaped unloader 5, and the star-shaped unloader 5 is connected with the soil cooler 6; the heat exchange/steam separator 8 is further respectively connected with a combustion-supporting gas pipeline 9 and the thermal incinerator 1, and a valve is disposed between any two of the three connected with each other; the absorption reactor 10 is further connected with the thermal incinerator 1, and a valve is disposed between the two; the absorption reactor 10 is further provided with a fuel oil inlet, where the thermal incinerator 1 is a mechanical atomized fuel burner, the thermal desorption reactor 4 is a fixed bed reactor, the dust collector 7 is a cyclone dust collector, the heat exchange/steam separator 8 is a double-pipe heat exchanger, the absorption reactor 10 is a packed tower, and the soil cooler 6 is a water-cooled screw conveyor.

In organic-contaminated soil of a chemical engineering site, the content of organic pollutant polycyclic aromatic hydrocarbons (anthracene) was 17.22 mg/kg. After treatment by a pretreatment system, the soil had a water content of 14% and a grain size of 25 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of light diesel oil and combustion-supporting gas of pure oxygen into the mechanical atomized fuel burner, mix, and perform thermal incineration for 7 s to generate high temperature flue gas of 800° C.

Step 2 of flue gas temperature regulation: mix the high temperature flue gas generated in step 1 with room temperature air to obtain thermally-desorbed flue gas, and adjust the temperature of the thermally-desorbed flue gas to 400° C. by changing the flow ratio of the high temperature flue gas to the room temperature air.

Step 3 of thermal desorption: place the contaminated soil containing the polycyclic aromatic hydrocarbons (anthracene) in the fixed bed reactor, subject the thermally-desorbed flue gas after the temperature regulation in step 2 to reverse contact with the to-be-treated polycyclic aromatic hydrocarbons (anthracene)-contaminated soil in the fixed bed reactor for 17 min, and desorb organic pollutants under high temperature and enter into desorbed flue gas to form desorbed waste gas containing the organic pollutants and thermally-desorbed soil.

Step 4 of dedusting: put the desorbed waste gas containing the organic pollutants obtained in step 3 into the cyclone dust collector for dedusting, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas of pure oxygen in the double-pipe heat exchanger, introduce the dedusted adsorbed waste gas containing the organic pollutants into the combustion-supporting gas of pure oxygen and perform heat exchange and cooling in the double-pipe heat exchanger to recycle heat, lower the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of light diesel oil in the packed tower, and control the gas velocity of the empty tower at 0.1 m/s; use the fresh light diesel oil in the packed tower as an absorbent to make the organic pollutants in the waste gas absorbed and purified by the fuel oil and to make the content of the polycyclic aromatic hydrocarbons (anthracene) in the purified gas lower than 0.03 g/m$^3$ and comply with the national emission standards, and perform up-to-standard discharge of the waste gas; and feed the fuel oil containing the organic pollutants which are the polycyclic aromatic hydrocarbons (anthracene) back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the polycyclic aromatic hydrocarbons (anthracene) in the discharged soil reach the limit requirements for the site remediation target of 0.65 mg/kg, and to make the removal rate of the polycyclic aromatic hydrocarbons (anthracene) reach 96.23%.

Embodiment 2

A system for thermal desorption treatment of organic-contaminated soil and treatment of desorbed waste gas is different from Embodiment 1 in that the thermal incinerator 1 is a revolving cup type atomized fuel burner, the thermal desorption reactor 4 is a fluidized bed reactor, the dust collector 7 is a bag-type dust collector, and the heat exchange/steam separator 8 is a plate heat exchanger.

In an organic-contaminated soil, the content of organic pollutant VOCs (benzene) was 34.5 mg/kg. After treatment by a pretreatment system, the soil had a water content of 11% and a grain size of 8 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of heavy oil and combustion-supporting gas respectively into the revolving cup type atomized fuel burner, mix, and perform thermal incineration for 5 s to generate high temperature flue gas of 900° C., the volume fraction of oxygen in the combustion-supporting gas is 25%, and the volume fraction of nitrogen in the combustion-supporting gas is 75%.

Step 2 of flue gas temperature regulation: mix the high temperature flue gas generated in step 1 with room temperature air in the desorption flue gas temperature regulating device to obtain thermally-desorbed flue gas, and adjust the temperature of the thermally-desorbed flue gas to 120° C. by changing the flow ratio of the high temperature flue gas to normal temperature gas.

Step 3 of thermal desorption: place the VOCs (benzene)-contaminated soil in the fluidized bed reactor, subject the thermally-desorbed flue gas after the temperature regulation in step 2 to reverse contact with the to-be-treated VOCs (benzene)-contaminated soil in the fluidized bed reactor for 5 min, and desorb VOCs (benzene) and enter into desorbed flue gas under the action of high temperature, to form desorbed waste gas containing organic pollutants and thermally-desorbed soil.

Step 4 of dedusting: put the desorbed waste gas containing the organic pollutants obtained in step 3 into the bag-type dust collector for dedusting, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the plate heat exchanger, introduce the dedusted adsorbed waste gas containing the organic pollutants into the combustion-supporting gas and perform heat exchange and cooling in the plate heat exchanger to recycle heat, lower the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of heavy oil in the packed tower, and control the gas velocity of the empty tower at 2 m/s; use the fresh heavy oil in the packed tower as an absorbent to make the organic pollutants in the waste gas absorbed and purified by the fuel oil and to make the content of the VOCs (benzene) in the purified gas lower than 0.35 g/m$^3$ and comply with the national emission standards, and perform up-to-standard discharge of the waste gas; and feed the fuel oil containing the organic pollutants which are the VOCs (benzene) back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the VOCs (benzene) in the discharged soil reach the limit requirements for the site remediation target of 0.04 mg/kg, and to make the removal rate of the VOCs (benzene) reach 99.8%.

Embodiment 3

A system for thermal desorption treatment of organic-contaminated soil and treatment of desorbed waste gas is different from Embodiment 1 in that the thermal incinerator 1 is a revolving cup type atomized fuel burner, the thermal desorption reactor 4 is a fluidized bed reactor, the dust collector 7 is a bag-type dust collector, and the heat exchange/steam separator 8 is a plate heat exchanger.

In an organic-contaminated soil, the content of organic pollutant VOCs (benzene) was 34.5 mg/kg. After treatment by a pretreatment system, the soil had a water content of 11% and a grain size of 8 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of heavy diesel oil and combustion-supporting gas respectively into the revolving cup type atomized fuel burner, mix, and perform thermal incineration for 8 s to generate high temperature flue gas of 800° C., the volume fraction of oxygen in the combustion-supporting gas is 35%, and the volume fraction of nitrogen in the combustion-supporting gas is 65%.

Step 2 of flue gas temperature regulation: mix the high temperature flue gas generated in step 1 with room temperature air in the desorption flue gas temperature regulating device to obtain thermally-desorbed flue gas, and adjust the temperature of the thermally-desorbed flue gas to 120° C. by changing the flow ratio of the high temperature flue gas to normal temperature gas.

Step 3 of thermal desorption: place the VOCs (benzene)-contaminated soil in the fluidized bed reactor, subject the thermally-desorbed flue gas after the temperature regulation in step 2 to reverse contact with the to-be-treated VOCs (benzene)-contaminated soil in the fluidized bed reactor for 6 min, and desorb VOCs (benzene) and enter into desorbed flue gas under the action of high temperature, to form desorbed waste gas containing organic pollutants and thermally-desorbed soil.

Step 4 of dedusting: put the desorbed waste gas containing the organic pollutants obtained in step 3 into the bag-type dust collector for dedusting, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the plate heat exchanger, introduce the dedusted adsorbed waste gas containing the organic pollutants into the combustion-supporting gas and perform heat exchange and cooling in the plate heat exchanger to recycle heat, lower the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of heavy diesel oil in the packed tower, and control the gas velocity of the empty tower at 1 m/s; use the fresh heavy diesel oil in the packed tower as an absorbent to make the organic pollutants in the waste gas absorbed and purified by the fuel oil and to make the content of the VOCs (benzene) in the purified gas lower than 0.35 g/m$^3$ and comply with the national emission standards, and perform up-to-standard discharge of the waste gas; and feed the fuel oil containing the organic pollutants which are the VOCs (benzene) back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the VOCs (benzene) in the discharged soil reach the limit requirements for the site remediation target of 0.04 mg/kg, and to make the removal rate of the VOCs (benzene) reach 99.8%.

Embodiment 4

A system for thermal desorption treatment of organic-contaminated soil and treatment of desorbed waste gas is different from Embodiment 1 in that the thermal incinerator 1 is an air atomized fuel burner, the thermal desorption reactor 4 is a moving bed reactor, the dust collector 7 is an electrostatic dust collector, the heat exchange/steam separator 8 is a fixed tube-sheet heat exchanger, and the absorption reactor 10 is a turbulent ball tower.

In an organic-contaminated soil of a pesticide-contaminated site, the content of organic pollutant toluene was 843.42 mg/kg. After treatment by a pretreatment system, the soil had a water content of 12% and a grain size of 18 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of biodiesel and combustion-supporting gas respectively into the air atomized fuel burner, mix, and perform thermal incineration for 10 s to generate high temperature flue gas of 1000° C., the volume fraction of oxygen in the combustion-supporting gas is 45%, and the volume fraction of nitrogen in the combustion-supporting gas is 55%.

Step 2 of flue gas temperature regulation: mix the high temperature flue gas generated in step 1 with room temperature air in the desorption flue gas temperature regulating device to obtain thermally-desorbed flue gas, and adjust the temperature of the thermally-desorbed flue gas to 300° C. by changing the flow ratio of the high temperature flue gas to normal temperature gas.

Step 3 of thermal desorption: place the toluene-contaminated soil in the moving bed reactor, subject the thermally-desorbed flue gas after the temperature regulation in step 2 to reverse contact with the to-be-treated toluene-contaminated soil in the moving bed reactor for 25 min, and desorb toluene and enter into desorbed flue gas under the action of high temperature, to form desorbed waste gas containing organic pollutants and thermally-desorbed soil.

Step 4 of dedusting: put the desorbed waste gas containing the organic pollutants obtained in step 3 into the electrostatic dust collector for dedusting, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the fixed tube-sheet heat exchanger, introduce the dedusted adsorbed waste gas containing the organic pollutants into the combustion-supporting gas and perform heat exchange and cooling in the fixed tube-sheet heat exchanger to recycle heat, lower the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of biodiesel in the turbulent ball tower, and control the gas velocity of the empty tower at 1 m/s; use the fresh biodiesel in the turbulent ball tower as an absorbent to make the organic pollutants in the waste gas absorbed and purified by the fuel oil and to make the content of the toluene in the purified gas lower than 0.02 g/m$^3$ and comply with the national emission standards, and perform up-to-standard discharge of the waste gas; and feed the fuel oil containing the organic pollutant which is toluene back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the toluene in the discharged soil reach the limit requirements for the site remediation target of 1.0 mg/kg, and to make the removal rate of the toluene reach 99.9%.

Embodiment 5

A system for thermal desorption treatment of organic-contaminated soil and treatment of desorbed waste gas is different from Embodiment 1 in that the thermal incinerator 1 is a steam atomizing burner, the dust collector 7 is an electric-bag composite dust collector, the heat exchange/steam separator 8 is a floating head type heat exchanger, and the absorption reactor 10 is a turbulent ball tower.

In an organic-contaminated soil of a pesticide-contaminated site, the content of organic pollutant ethylbenzene was 642.35 mg/kg. After treatment by a pretreatment system, the soil had a water content of 14% and a grain size of 12 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of petroleum washing oil and combustion-supporting gas respectively into the steam atomizing burner, mix, and perform thermal incineration for 4 s to generate high temperature flue gas of 1500° C., the volume fraction of oxygen in the combustion-supporting gas is 65%, and the volume fraction of nitrogen in the combustion-supporting gas is 35%.

Step 2 of flue gas temperature regulation: mix the high temperature flue gas generated in step 1 with room temperature nitrogen in the desorption flue gas temperature regulating device to obtain thermally-desorbed flue gas, and adjust the temperature of the thermally-desorbed flue gas to 500° C. by changing the flow ratio of the high temperature flue gas to normal temperature gas.

Step 3 of thermal desorption: place the ethylbenzene-contaminated soil in the fixed bed reactor, subject the thermally-desorbed flue gas after the temperature regulation in step 2 to reverse contact with the to-be-treated ethylbenzene-contaminated soil in the fixed bed reactor for 21 min, and desorb ethylbenzene and enter into desorbed flue gas under the action of high temperature, to form the desorbed waste gas containing organic pollutants and thermally-desorbed soil.

Step 4 of dedusting: put the desorbed waste gas containing the organic pollutants obtained in step 3 into the electric-bag composite dust collector for dedusting, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the floating head type heat exchanger, introduce the dedusted adsorbed waste gas containing the organic pollutants into the combustion-supporting gas and perform heat exchange and cooling in the floating head type heat exchanger to recycle heat, lower the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of petroleum washing oil in the turbulent ball tower, and control the gas velocity of the empty tower at 7 m/s; use the fresh petroleum washing oil in the turbulent ball tower as an absorbent to make the organic pollutants in the waste gas absorbed and purified by the fuel oil and to make the content of the ethylbenzene in the purified gas lower than 0.02 g/m$^3$ and comply with the national emission standards, and perform up-to-standard discharge of the waste gas; and feed the fuel oil containing the organic pollutant which is ethylbenzene back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the ethylbenzene in the discharged soil reach the limit requirements for the site remediation target of 1.92 mg/kg, and to make the removal rate of the ethylbenzene reach 99.7%.

Embodiment 6

A system for thermal desorption treatment of organic-contaminated soil and treatment of desorbed waste gas is different from Embodiment 1 in that the thermal incinerator 1 is a steam atomizing burner, the dust collector 7 is an electric-bag composite dust collector, the heat exchange/steam separator 8 is a floating head type heat exchanger, and the absorption reactor 10 is a turbulent ball tower.

In an organic-contaminated soil of a pesticide-contaminated site, the content of organic pollutant ethylbenzene was 642.35 mg/kg. After treatment by a pretreatment system, the soil had a water content of 14% and a grain size of 12 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of petroleum washing oil and combustion-supporting gas respectively into the air atomized fuel burner, mix, and perform thermal incineration for 5 s to generate high temperature flue gas of 1450° C., the volume fraction of oxygen in the combustion-supporting gas is 65%, and the volume fraction of nitrogen in the combustion-supporting gas is 35%.

Step 2 of flue gas temperature regulation: mix the high temperature flue gas generated in step 1 with room temperature nitrogen in the desorption flue gas temperature regulating device to obtain thermally-desorbed flue gas, and adjust the temperature of the thermally-desorbed flue gas to 500° C. by changing the flow ratio of the high temperature flue gas to normal temperature gas.

Step 3 of thermal desorption: place the ethylbenzene-contaminated soil in the fixed bed reactor, subject the thermally-desorbed flue gas after the temperature regulation in step 2 to reverse contact with the to-be-treated ethylbenzene-contaminated soil in the moving bed reactor for 22 min, and desorb ethylbenzene and enter into desorbed flue gas under the action of high temperature, to form desorbed waste gas containing organic pollutants and thermally-desorbed soil.

Step 4 of dedusting: put the desorbed waste gas containing the organic pollutants obtained in step 3 into the electric-bag composite dust collector for dedusting, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the floating head type heat exchanger, introduce the dedusted adsorbed waste gas containing the organic pollutants into the combustion-supporting gas and perform heat exchange and cooling in the floating head type heat exchanger to recycle heat, reduce the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of petroleum washing oil in the turbulent ball tower, and control the gas velocity of the empty tower at 5 m/s; use the fresh petroleum washing oil in the turbulent ball tower as an absorbent to make the organic pollutants in the waste gas absorbed and purified by the fuel oil and to make the content of the ethylbenzene in the purified gas lower than 0.02 g/m$^3$ and comply with the national emission standards, and perform up-to-standard discharge of the waste gas; and feed the fuel oil containing the organic pollutant which is ethylbenzene back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the ethylbenzene in the discharged soil reach the limit requirements for the site remediation target of 1.92 mg/kg, and to make the removal rate of the ethylbenzene reach 99.7%.

Embodiment 7

A system for thermal desorption treatment of organic-contaminated soil and treatment of desorbed waste gas is different from Embodiment 1 in that the thermal desorption reactor 1 is a fluidized bed reactor, the dust collector 7 is an impact dust collector, the heat exchange/steam separator 8 is a U-tube heat exchanger, and the absorption reactor 10 is a sieve-plate tower.

In organic-contaminated soil of a chemical engineering site, the content of organic pollutants total petroleum hydrocarbons (TPH) was 520.23 mg/kg. After treatment by a pretreatment system, the soil had a water content of 14% and a grain size of 12 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of tar washing oil and combustion-supporting gas respectively into the mechanical atomized fuel burner, mix, and perform thermal incineration for 6 s to generate high temperature flue gas of 950° C., the volume fraction of oxygen in the combustion-supporting gas is 75%, and the volume fraction of nitrogen in the combustion-supporting gas is 25%.

Step 2 of flue gas temperature regulation: mix the high temperature flue gas generated in step 1 with room temperature nitrogen in the desorption flue gas temperature regulating device to obtain thermally-desorbed flue gas, and adjust the temperature of the thermally-desorbed flue gas to 500° C. by changing the flow ratio of the high temperature flue gas to normal temperature gas.

Step 3 of thermal desorption: place the total petroleum hydrocarbons (TPH)-contaminated soil in the fluidized bed reactor, subject the thermally-desorbed flue gas after the temperature regulation in step 2 to reverse contact with the to-be-treated total petroleum hydrocarbons (TPH)-contaminated soil in the fluidized bed reactor for 18 min, and desorb the total petroleum hydrocarbons (TPH) and enter into desorbed flue gas under the action of high temperature, to form desorbed waste gas containing organic pollutants and thermally-desorbed soil.

Step 4 of dedusting: put the desorbed waste gas containing the organic pollutants obtained in step 3 into the impact dust collector for dedusting, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the floating head type heat exchanger, introduce the dedusted adsorbed waste gas containing the organic pollutants into the combustion-supporting gas and perform heat exchange and cooling in the U-tube heat exchanger to recycle heat, reduce the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of tar washing oil in the sieve-plate tower, and control the gas velocity of the empty tower at 0.8 m/s; use the fresh tar washing oil in the sieve-plate tower as an absorbent to make the organic pollutants in the waste gas absorbed and purified by the fuel oil and to make the content of the total petroleum hydrocarbons (TPH) in the purified gas lower than 0.02 g/m$^3$ and comply with the national emission standards, and perform up-to-standard discharge of the waste gas; and feed the fuel oil containing the organic pollutants which are the total petroleum hydrocarbons (TPH) back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the total petroleum hydrocarbons (TPH) in the discharged soil reach the limit requirements for the site remediation target of 1.56 mg/kg, and to make the removal rate of the total petroleum hydrocarbons (TPH) reach 99.7%.

Embodiment 8

A system for thermal desorption treatment of organic-contaminated soil and treatment of desorbed waste gas is different from Embodiment 1 in that the thermal incinerator 1 is an air atomized fuel burner, the thermal desorption reactor 4 is a moving bed reactor, the dust collector 7 is a scrubber, the heat exchange/steam separator 8 is a U-tube heat exchanger, and the absorption reactor 10 is a sieve-plate tower.

In organic-contaminated soil of a chemical engineering site, the content of organic pollutants which are chlorinated volatile organic compounds (CVOCs) was 758.15 mg/kg. After treatment by a pretreatment system, the soil had a water content of 15% and a grain size of 17 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of methanol and combustion-supporting gas respectively into the air atomized fuel burner, mix, and perform thermal incineration for 8 s to generate high temperature flue gas of 1100° C., the volume fraction of oxygen in the combustion-supporting gas is 85%, and the volume fraction of nitrogen in the combustion-supporting gas is 15%.

Step 2 of flue gas temperature regulation: mix the high temperature flue gas generated in step 1 with room temperature nitrogen in the desorption flue gas temperature regulating device to obtain thermally-desorbed flue gas, and adjust the temperature of the thermally-desorbed flue gas to 820° C. by changing the flow ratio of the high temperature flue gas to normal temperature gas.

Step 3 of thermal desorption: place the chlorinated volatile organic compounds (CVOCs)-contaminated soil in the moving bed reactor, subject the thermally-desorbed flue gas after the temperature regulation in step 2 to reverse contact with the to-be-treated chlorinated volatile organic compounds (CVOCs)-contaminated soil in the moving bed reactor for 25 min, and desorb the chlorinated volatile organic compounds (CVOCs) and enter into desorbed flue gas under the action of high temperature, to form desorbed waste gas containing organic pollutants and thermally-desorbed soil.

Step 4 of dedusting: put the desorbed waste gas containing the organic pollutants obtained in step 3 into the scrubber, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the tube-sheet heat exchanger, introduce the dedusted adsorbed waste gas containing the organic pollutants into the combustion-supporting gas and perform heat exchange and cooling in the tube-sheet heat exchanger to recycle heat, reduce the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of methanol in the sieve-plate tower, and control the gas velocity of the empty tower at 3 m/s; use the fresh methanol in the sieve-plate tower as an absorbent to make the organic pollutants in the waste gas absorbed and purified by the fuel oil and to make the content of the chlorinated volatile organic compounds (CVOCs) in the purified gas lower than 0.02 g/m$^3$ and comply with the national emission standards, and perform up-to-standard discharge of the waste gas; and feed the fuel oil containing the organic pollutants which are the chlorinated volatile organic compounds (CVOCs) back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the chlorinated volatile organic compounds (CVOCs) in the discharged soil reach the limit requirements for the site remediation target of 1.52 mg/kg, and to make the removal rate of the chlorinated volatile organic compounds (CVOCs) reach 99.8%.

Embodiment 9

A system for thermal desorption treatment of organic-contaminated soil and treatment of desorbed waste gas is different from Embodiment 1 in that the thermal incinerator 1 is an air atomized fuel burner, the thermal desorption reactor 4 is a moving bed reactor, the dust collector 7 is a scrubber, the heat exchange/steam separator 8 is a fixed tube-sheet heat exchanger, and the absorption reactor 10 is a sieve-plate tower.

In organic-contaminated soil of a chemical engineering site, the content of organic pollutants which are chlorinated volatile organic compounds (CVOCs) was 758.15 mg/kg. After treatment by a pretreatment system, the soil had a water content of 15% and a grain size of 17 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: put fuel oil of methanol and combustion-supporting gas into the air atomized fuel burner, mix, and perform thermal incineration for 7 s to generate high temperature flue gas of 1150° C., the volume fraction of oxygen in the combustion-supporting gas is 85%, and the volume fraction of nitrogen in the combustion-supporting gas is 15%.

Step 2 of flue gas temperature regulation: mix the high temperature flue gas generated in step 1 with room temperature nitrogen in the desorption flue gas temperature regulating device to obtain thermally-desorbed flue gas, and adjust the temperature of the thermally-desorbed flue gas to 700° C. by changing the flow ratio of the high temperature flue gas to normal temperature gas.

Step 3 of thermal desorption: place the chlorinated volatile organic compounds (CVOCs)-contaminated soil in the moving bed reactor, subject the thermally-desorbed flue gas after the temperature regulation in step 2 to reverse contact with the to-be-treated chlorinated volatile organic compounds (CVOCs)-contaminated soil in the moving bed reactor for 24 min, and desorb chlorinated volatile organic compounds (CVOCs) and enter into desorbed flue gas under the action of high temperature, to form desorbed waste gas containing organic pollutants and thermally-desorbed soil.

Step 4 of dedusting: put the desorbed waste gas containing the organic pollutants obtained in step 3 into the scrubber, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the fixed tube-sheet heat exchanger, introduce the dedusted adsorbed waste gas containing the organic pollutants into the combustion-supporting gas and perform heat exchange and cooling in the fixed tube-sheet heat exchanger to recycle heat, reduce the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh fuel oil of methanol in the sieve-plate tower, and control the gas velocity of the empty tower at 2 m/s; use the fresh methanol in the sieve-plate tower as an absorbent to make the organic pollutants in the waste gas absorbed and purified by the fuel oil and to make the content of the chlorinated volatile organic compounds (CVOCs) in the purified gas lower than 0.02 g/m$^3$ and comply with the national emission standards, and perform up-to-standard discharge of the waste gas; and feed the fuel oil containing the organic pollutants which are the chlorinated volatile organic compounds (CVOCs) back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the chlorinated volatile organic compounds (CVOCs) in the discharged soil reach the limit requirements for the site remediation target of 1.52 mg/kg, and to make the removal rate of the chlorinated volatile organic compounds (CVOCs) reach 99.8%.

Embodiment 10

A system for thermal desorption treatment of organic-contaminated soil and treatment of desorbed waste gas is different from Embodiment 1 in that the thermal incinerator is an air atomized fuel burner, the thermal desorption reactor is a moving bed reactor, the dust collector is a scrubber, the heat exchange/steam separator 8 is a fixed tube-sheet heat exchanger, and the absorption reactor is a sieve-plate tower.

In organic-contaminated soil of a chemical engineering site, the content of organic pollutants chlorinated volatile organic compounds (CVOCs) was 758.15 mg/kg. After treatment by a pretreatment system, the soil had a water content of 15% and a grain size of 17 mm. The thermal desorption and treatment of the desorbed waste gas are performed by utilizing the system for thermal desorption treatment of organic-contaminated soil and treatment of desorbed waste gas, and the specific steps are as follows:

Step 1 of thermal incineration: mix fuel oil of diesel oil and coking washing oil at a ratio of 1:1, put the mixture and combustion-supporting gas respectively into the air atomized fuel burner, mix, and perform thermal incineration for 7 s to generate high temperature flue gas of 1000° C., the volume fraction of oxygen in the combustion-supporting gas is 85%, and the volume fraction of nitrogen in the combustion-supporting gas is 15%.

Step 2 of flue gas temperature regulation: mix the high temperature flue gas generated in step 1 with room temperature nitrogen in the desorption flue gas temperature regulating device to obtain thermally-desorbed flue gas, and adjust the temperature of the thermally-desorbed flue gas to 700° C. by changing the flow ratio of the high temperature flue gas to normal temperature gas.

Step 3 of thermal desorption: place the chlorinated volatile organic compounds (CVOCs)-contaminated soil in the moving bed reactor, subject the thermally-desorbed flue gas after the temperature regulation in step 2 to reverse contact with the to-be-treated chlorinated volatile organic compounds (CVOCs)-contaminated soil in the moving bed reactor for 24 min, and desorb chlorinated volatile organic compounds (CVOCs) and enter into desorbed flue gas under the action of high temperature, to form desorbed waste gas containing organic pollutants and thermally-desorbed soil.

Step 4 of dedusting: put the desorbed waste gas containing the organic pollutants obtained in step 3 into the scrubber, and separate particulate matter from the waste gas to generate dedusted waste gas containing the organic pollutants.

Step 5 of heat exchange: perform indirect heat exchange between the dedusted adsorbed waste gas containing the organic pollutants in step 4 and the combustion-supporting gas in the tube-sheet heat exchanger, introduce the dedusted adsorbed waste gas containing the organic pollutants into the combustion-supporting gas and perform heat exchange and cooling in the tube-sheet heat exchanger to recycle heat, reduce the temperature of the adsorbed waste gas containing the organic pollutants and increase the temperature of the combustion-supporting gas, separate moisture from the adsorbed waste gas containing the organic pollutants in the form of condensed water, feed the heated combustion-supporting gas to step 1, and the use of the combustion-supporting gas is the same as that in step 1.

Step 6 of absorption and purification: subject the adsorbed waste gas containing the organic pollutants treated in step 5 to countercurrent contact with fresh mixed fuel oil in the sieve-plate tower, and control the gas velocity of the empty tower at 2 m/s; use the fresh mixed fuel oil in the sieve-plate tower as an absorbent to make the organic pollutants in the waste gas absorbed and purified by the fuel oil and to make the content of the chlorinated volatile organic compounds (CVOCs) in the purified gas lower than 0.02 g/m$^3$ and comply with the national emission standards, and perform up-to-standard discharge of the waste gas; and feed the fuel oil containing the organic pollutants which are the chlorinated volatile organic compounds (CVOCs) back to step 1 for thermal incineration.

Step 7 of soil cooling: put the thermally-desorbed soil in step 3 into the water-cooled screw conveyor through the star-shaped unloader for cooling, and then humidify the soil with the condensed water obtained in step 5 and discharge the soil, to make the content of the chlorinated volatile organic compounds (CVOCs) in the discharged soil reach the limit requirements for the site remediation target of 1.52 mg/kg, and to make the removal rate of the chlorinated volatile organic compounds (CVOCs) reach 99.8%.

The embodiments described above are only intended to describe the preferred embodiments of the present invention, and are not intended to limit the scope of the present invention. Various modifications and improvements performed on the technical solution of the present invention by those skilled in the art without departing from the design spirit of the present invention shall fall within the protection scope as defined by the claims of the present invention.

What is claimed is:

1. A method for thermal desorption treatment of organic-contaminated soil and treatment of desorbed waste gas, comprising the following specific steps:

step 1 of thermal incineration: mixing fuel and combustion-supporting gas and performing thermal incineration to generate high temperature flue gas of 800-1500° C.;

step 2 of flue gas temperature regulation: mixing the high temperature flue gas generated in step 1 with normal temperature gas to obtain thermally-desorbed flue gas, and adjusting the temperature of the thermally-desorbed flue gas to 120-820° C. by changing the ratio of the high temperature flue gas to the normal temperature gas;

step 3 of thermal desorption: subjecting the thermally-desorbed flue gas obtained after the temperature regulation in step 2 to reverse contact with organic-contaminated soil for 5-25 min, and desorbing organic pollutants under high temperature and entering into desorbed flue gas, to form desorbed waste gas containing the organic pollutants and thermally-desorbed soil;

step 4 of dedusting: dedusting the desorbed waste gas containing the organic pollutants obtained in step 3, to generate dedusted waste gas containing the organic pollutants;

step 5 of heat exchange: performing indirect heat exchange between the dedusted waste gas containing the organic pollutants in step 4 and the combustion-supporting gas to lower the temperature of the dedusted waste gas containing the organic pollutants and increase the temperature of the combustion-supporting gas, separating moisture from the dedusted waste gas containing the organic pollutants in the form of condensed water, and feeding the heated combustion-supporting gas to step 1;

step 6 of absorption and purification: subjecting the dedusted waste gas containing the organic pollutants treated in step 5 to countercurrent contact with fresh fuel, and absorbing and purifying the organic pollutants in the waste gas by the fuel; and feeding the fuel containing the organic pollutants back to step 1 for thermal incineration; and step 7 of soil cooling: cooling the thermally-desorbed soil in step 3, and then humidifying the soil with the condensed water obtained in step 5 and discharging the soil.

2. The method for thermal desorption treatment of organic-contaminated soil and treatment of desorbed waste gas according to claim 1, wherein the fuel in step 1 is one or a liquid mixture of two or more selected from a group consisting of light diesel oil, heavy diesel oil, kerosene, heavy oil, biodiesel, petroleum washing oil, tar washing oil, ethanol, methanol, heptane, n-hexane, and n-octane at any proportion; the combustion-supporting gas in step 1 comprises a gas with an air or oxygen volume fraction of 25%-100%; and the normal temperature gas in step 2 is one or a mixture of two selected from a group consisting of room temperature air and room temperature nitrogen in any proportion.

3. The method for thermal desorption treatment of organic-contaminated soil and treatment of desorbed waste gas according to claim 1, wherein the organic pollutants in the step 3 comprise one or more selected from a group consisting of benzene, toluene, ethylbenzene, xylene, naphthalene, benzanthracene, benzofluoranthene, benzopyrene, periflanthene, dibenzanthracene, dichlorodiphenyl trichloroethane, and benzene hexachloride.

* * * * *